United States Patent
Bear et al.

(10) Patent No.: US 7,548,255 B2
(45) Date of Patent: Jun. 16, 2009

(54) METHOD AND SYSTEM FOR CAPTURING VIDEO ON A PERSONAL COMPUTER

(75) Inventors: Eric Gould Bear, Bellevue, WA (US);
Chad Magendanz, Issaquah, WA (US);
Aditha May Adams, Seattle, WA (US);
Carl Ledbetter, Mercer Island, WA (US); Steve Kaneko, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 10/677,118

(22) Filed: Sep. 30, 2003

(65) Prior Publication Data

US 2005/0068423 A1    Mar. 31, 2005

(51) Int. Cl.
*H04N 5/225* (2006.01)
*H04N 7/14* (2006.01)

(52) U.S. Cl. ............... 348/207.11; 348/14.01
(58) Field of Classification Search ............... 348/14.01, 348/207.7, 207.11
See application file for complete search history.

(56) References Cited

U.S. PATENT DOCUMENTS

| | | | |
|---|---|---|---|
| 4,860,342 A | 8/1989 | Danner | |
| 5,159,445 A | 10/1992 | Gitlin | |
| 5,412,417 A | 5/1995 | Tozuka | |
| 5,487,181 A | 1/1996 | Dailey | |
| 5,491,800 A | 2/1996 | Goldsmith | |
| 5,519,772 A | 5/1996 | Akman et al. | |
| 5,533,115 A | 7/1996 | Hollenbach | |
| 5,546,538 A | 8/1996 | Cobbley | |
| 5,568,540 A | 10/1996 | Grecko | 379/88.25 |
| 5,657,414 A | 8/1997 | Lett | |
| 5,675,374 A | 10/1997 | Kohda | 348/14.1 |
| 5,675,810 A | 10/1997 | Sellers | |
| 5,764,901 A * | 6/1998 | Skarbo et al. | 709/204 |
| 5,768,164 A | 6/1998 | Hollon | |
| 5,802,305 A | 9/1998 | McKaughan | |

(Continued)

FOREIGN PATENT DOCUMENTS

EP    0772327 A2    5/1997

(Continued)

OTHER PUBLICATIONS

U.S. Appl. No. 11/509,437, filed Aug. 23, 2006, Bear.

(Continued)

*Primary Examiner*—Justin P Misleh
(74) *Attorney, Agent, or Firm*—Workman Nydegger

(57) ABSTRACT

A system and method for improved video capture on a personal computer is provided. The personal computer is equipped with video controls and a camera with a privacy lens cover. A sensor for sensing when the lens cover is closed may be used along with an actuator for mechanically opening the lens cover, so that the system may optionally open the lens cover automatically for video capture applications. A user may easily capture a video stream or still images using the video controls provided. A user may also answer an incoming phone call that supports video by pressing the camera button or, optionally, the user can set a preference so that the camera is automatically enabled whenever answering a call that supports video. Additionally, the system may automatically transition to or from video anytime during a call.

18 Claims, 11 Drawing Sheets

U.S. PATENT DOCUMENTS

| | | | |
|---|---|---|---|
| 5,907,604 A * | 5/1999 | Hsu | 379/142.06 |
| 5,959,622 A * | 9/1999 | Greer et al. | 715/719 |
| 5,991,836 A | 11/1999 | Renda | |
| 5,999,613 A | 12/1999 | Nabkel | |
| 6,006,285 A | 12/1999 | Jacobs | |
| 6,052,442 A | 4/2000 | Cooper et al. | 379/88.19 |
| 6,101,610 A | 8/2000 | Beebe | |
| 6,144,363 A | 11/2000 | Alloul | 345/618 |
| 6,144,644 A | 11/2000 | Bajzath et al. | 370/259 |
| 6,172,703 B1 | 1/2001 | Lee | 348/14.08 |
| 6,208,373 B1 | 3/2001 | Fong et al. | 348/14.16 |
| 6,215,420 B1 | 4/2001 | Harrison et al. | 341/22 |
| 6,237,846 B1 | 5/2001 | Lowell | |
| 6,240,168 B1 | 5/2001 | Stanford et al. | |
| 6,266,714 B1 | 7/2001 | Jacobs | |
| 6,279,056 B1 | 8/2001 | Jacobs | |
| 6,282,435 B1 | 8/2001 | Wagner et al. | 455/566 |
| 6,346,934 B1 | 2/2002 | Wugofski | 345/158 |
| 6,362,440 B1 | 3/2002 | Karidis | |
| 6,380,968 B1 * | 4/2002 | Alexander et al. | 348/14.05 |
| 6,390,371 B1 | 5/2002 | Armga | |
| 6,417,849 B2 | 7/2002 | Lefebvre | |
| 6,438,216 B1 | 8/2002 | Akata | |
| 6,438,585 B2 | 8/2002 | Mousseau | |
| 6,453,027 B1 | 9/2002 | Kang | |
| 6,483,905 B1 | 11/2002 | Kikinis | 379/93.24 |
| 6,484,019 B1 | 11/2002 | Aklian | |
| 6,496,860 B2 | 12/2002 | Ludtke | |
| 6,507,356 B1 | 1/2003 | Jackel et al. | 348/14.06 |
| 6,513,128 B1 | 1/2003 | Wang | |
| 6,516,356 B1 | 2/2003 | Belknap et al. | |
| 6,518,957 B1 | 2/2003 | Lehtinen et al. | |
| 6,519,335 B1 | 2/2003 | Bushnell | |
| 6,546,262 B1 | 4/2003 | Freadman | |
| 6,603,855 B1 | 8/2003 | Cannon et al. | |
| 6,628,194 B1 | 9/2003 | Hellebust | 340/7.5 |
| 6,628,267 B2 | 9/2003 | Karidis | |
| 6,658,095 B1 | 12/2003 | Yoakum | |
| 6,671,356 B2 | 12/2003 | Lewis | 379/88.13 |
| 6,671,743 B1 | 12/2003 | Verity | 709/321 |
| 6,674,457 B1 * | 1/2004 | Davies et al. | 348/14.01 |
| 6,680,845 B2 * | 1/2004 | Agata et al. | 361/683 |
| 6,691,233 B1 | 2/2004 | Gannage | |
| 6,718,183 B1 | 4/2004 | Blust | |
| 6,731,316 B2 | 5/2004 | Herigstad et al. | 715/864 |
| 6,732,365 B2 | 5/2004 | Belknap | |
| 6,741,232 B1 | 5/2004 | Siedlikowski | 345/156 |
| 6,757,372 B1 | 6/2004 | Dunlap et al. | 379/142 |
| 6,806,867 B1 | 10/2004 | Arruda | |
| 6,816,881 B1 | 11/2004 | Mohindra | |
| 6,819,961 B2 | 11/2004 | Jacobs | |
| 6,831,657 B2 | 12/2004 | Tsutsumi et al. | 345/589 |
| 6,882,326 B2 | 4/2005 | Hirayama | 345/1.1 |
| 6,888,562 B2 | 5/2005 | Rambo et al. | 348/14.16 |
| 6,892,074 B2 | 5/2005 | Tarkiainen | 455/466 |
| 6,897,851 B2 | 5/2005 | Carini | |
| 6,902,332 B2 | 6/2005 | McLoone | 400/472 |
| 6,912,283 B2 | 6/2005 | Meyerson et al. | 379/428.04 |
| 6,918,123 B1 | 7/2005 | Shteyn | |
| 6,937,950 B2 | 8/2005 | Cragun | |
| 6,938,174 B2 | 8/2005 | LeKuch | |
| 6,944,700 B2 * | 9/2005 | Bateman et al. | 710/300 |
| 6,970,556 B2 | 11/2005 | Wall et al. | 379/355.01 |
| 6,973,167 B2 | 12/2005 | Kikinis | 379/67.1 |
| 6,976,216 B1 | 12/2005 | Peskin et al. | 715/716 |
| 6,980,641 B1 | 12/2005 | Stanford et al. | 379/387 |
| 6,996,445 B1 | 2/2006 | Kamijo | 700/94 |
| 7,000,237 B1 | 2/2006 | Sinha | |
| 7,036,110 B2 | 4/2006 | Jeyaraman | |
| 7,096,391 B2 | 8/2006 | Johnson | |
| 7,123,370 B2 * | 10/2006 | Watanabe et al. | 358/1.14 |
| 7,221,331 B2 | 5/2007 | Bear | |
| 7,231,229 B1 | 6/2007 | Hawkins | |
| 7,243,130 B2 | 7/2007 | Horvitz | |
| 7,272,660 B1 | 9/2007 | Powers | |
| 7,292,588 B2 | 11/2007 | Milley | |
| 7,302,637 B1 | 11/2007 | Maguire | |
| 7,401,053 B2 | 7/2008 | Kamimura | |
| 2001/0040551 A1 | 11/2001 | Yates et al. | 345/156 |
| 2002/0004855 A1 | 1/2002 | Cox | |
| 2002/0015020 A1 | 2/2002 | Mobin | 345/156 |
| 2002/0080967 A1 | 6/2002 | Abdo | |
| 2002/0087225 A1 | 7/2002 | Howard | |
| 2002/0099456 A1 | 7/2002 | McLean | |
| 2002/0114430 A1 | 8/2002 | Murata | |
| 2002/0131072 A1 | 9/2002 | Jackson | |
| 2002/0167458 A1 | 11/2002 | Baudisch | |
| 2002/0167460 A1 | 11/2002 | Baudisch | |
| 2003/0021290 A1 | 1/2003 | Jones | 370/466 |
| 2003/0025674 A1 | 2/2003 | Watanabe | |
| 2003/0037180 A1 | 2/2003 | Madineni et al. | 709/321 |
| 2003/0046448 A1 | 3/2003 | Fischer | |
| 2003/0069689 A1 | 4/2003 | Ihara | |
| 2003/0074590 A1 | 4/2003 | Fogle | |
| 2003/0112325 A1 | 6/2003 | Boyden et al. | 348/14.16 |
| 2003/0118003 A1 | 6/2003 | Geck | |
| 2003/0122874 A1 | 7/2003 | Dieberger | |
| 2003/0131148 A1 | 7/2003 | Kelley et al. | 717/101 |
| 2003/0146903 A1 * | 8/2003 | Yi | 345/168 |
| 2003/0188041 A1 | 10/2003 | Fillmore | |
| 2003/0197685 A1 * | 10/2003 | Yi | 345/168 |
| 2003/0227471 A1 | 12/2003 | Eglit | |
| 2004/0103144 A1 | 5/2004 | Sallam | |
| 2004/0114032 A1 | 6/2004 | Kakii et al. | 348/14.08 |
| 2004/0135819 A1 | 7/2004 | Maa | |
| 2004/0141012 A1 | 7/2004 | Tootill | 345/827 |
| 2004/0155956 A1 | 8/2004 | Libbey | 348/14.16 |
| 2004/0177361 A1 | 9/2004 | Bernhard et al. | |
| 2004/0210628 A1 | 10/2004 | Inkinen | |
| 2004/0222977 A1 | 11/2004 | Bear et al. | 340/815.4 |
| 2004/0222978 A1 | 11/2004 | Bear | 345/172 |
| 2004/0223058 A1 | 11/2004 | Richter | |
| 2004/0223061 A1 | 11/2004 | Bear | 348/207.1 |
| 2004/0223599 A1 | 11/2004 | Bear | 379/215.01 |
| 2004/0225502 A1 | 11/2004 | Bear | 704/270 |
| 2004/0225892 A1 | 11/2004 | Bear | 726/2 |
| 2004/0225901 A1 | 11/2004 | Bear | 713/300 |
| 2004/0240167 A1 | 12/2004 | Ledbetter et al. | 361/683 |
| 2004/0240650 A1 | 12/2004 | Bear | 455/426.1 |
| 2005/0068423 A1 | 3/2005 | Bear | 345/156 |
| 2005/0069101 A1 | 3/2005 | Bear | 379/90.01 |
| 2005/0071437 A1 | 3/2005 | Bear | 713/1 |
| 2005/0071626 A1 | 3/2005 | Bear | |
| 2005/0182822 A1 | 8/2005 | Daniel | |
| 2005/0186942 A1 | 8/2005 | Griffin | |
| 2005/0193396 A1 | 9/2005 | Stafford-Fraser | |
| 2005/0259032 A1 | 11/2005 | Morris | |
| 2005/0262302 A1 | 11/2005 | Fuller | |
| 2006/0007051 A1 | 1/2006 | Bear | |
| 2006/0048062 A1 | 3/2006 | Adamson | |
| 2006/0061516 A1 | 3/2006 | Campbell | |
| 2006/0095525 A1 | 5/2006 | Mousseau | |
| 2006/0130075 A1 | 6/2006 | Rhoten | 719/328 |
| 2006/0164324 A1 | 7/2006 | Polivy | 709/206 |
| 2006/0284787 A1 | 12/2006 | Bear | |

FOREIGN PATENT DOCUMENTS

| | | |
|---|---|---|
| EP | 0777394 A1 | 6/1997 |
| EP | 000816990 | 1/1998 |
| EP | 0838934 A1 | 4/1998 |
| EP | 0772327 A3 | 2/1999 |
| WO | WO9602049 A1 | 1/1996 |

WO 03/085960 10/2003

OTHER PUBLICATIONS

U.S. Appl. No. 11/559,821, filed Nov. 14, 2006, Bear.
U.S. Appl. No. 11/685,014, filed Mar. 12, 2007, Bear.
Anonymous, Copy of International Search Report in Corresponding EP Application No. EP 04 00 9868.
Office Action dated Oct. 15, 2008 cited in U.S. Appl. No. 11/509,437.
Office Action dated Oct. 10, 2008 cited in U.S. Appl. No. 11/509,431.
Office Action dated Nov. 6, 2008 cited in U.S. Appl. 10/996,557.
Office Action dated Oct. 1, 2008 cited in U.S. Appl. No. 10/996,371.
U.S. Appl. No. 11/837,302, filed Aug. 10, 2007, Bear.
Oxford On-line Dictionary, http://dictionary.oed.com/entrance.dtl, Oxford University Press 2007, on the definition of the word "physical" under III/7b.
Office Action dated Aug. 8, 2007 cited in related U.S. Appl. No. 10/996,371.
Office Action dated Jul. 31, 2007 cited in related U.S. Appl. No. 10/677,084.
Office Action dated Jul. 27, 2007 cited in related U.S. Appl. No. 10/996,557.
Office Action dated Jul. 30, 2007 cited in related U.S. Appl. No. 10/430,369.
Office Action dated Jul. 6, 2007 cited in related U.S. Appl. No. 10/429,943.
Notice of Allowance dated Sep. 7, 2007 cited in related U.S. Appl. No. 10/429,931.
Office Action dated Sep. 24, 2007 cited in related U.S. Appl. No. 10/429,933.
Office Action dated Feb. 15, 2008 cited in related U.S. Appl. No. 10/429,933.
Notice of Allowance dated Jan. 30, 2008 cited in related U.S. Appl. No. 10/429,931.
Office Action dated Mar. 21, 2008 cited in related U.S. Appl. No. 10/966,557.
Office Action dated Feb. 28, 2008 cited in related U.S. Appl. No. 10/966,371.
Office Action dated Sep. 28, 2007 cited in related U.S. Appl. No. 10/429,943.
Office Action dated Mar. 26, 2008 cited in related U.S. Appl. No. 10/429,943.
Office Action dated Oct. 15, 2007 cited in related U.S. Appl. No. 10/429,903.
Notice of Allowance dated Apr. 2, 2008 cited in related U.S. Appl. No. 10/429,903.
Notice of Allowance dated Apr. 23, 2008 cited in related U.S. Appl. No. 10/430,369.
Office Action dated Jan. 11, 2008 cited in related U.S. Appl. No. 10/677,084.
Notice of Allowance dated Apr. 29, 2008 cited in related U.S. Appl. No. 10/677,084.
Office Action dated May 15, 2008 cited in related U.S. Appl. No. 11/837,302.
Office Action dated Aug. 6, 2008 cited in U.S. Appl. 10/429,943.
Office Action dated Aug. 20, 2006 cited in U.S. Appl. No. 10/429,933.
Office Action dated Feb. 14, 2007 cited in U.S. Appl. No. 10/429,905.
Office Action dated May 21, 2007 cited in U.S. Appl. No. 10/429,905.
Office Action dated Apr. 4, 2006 cited in U.S. Appl. No. 10/429,930.
Office Action dated Jul. 14, 2006 cited in U.S. Appl. No. 10/429,930.
Office Action dated Nov. 14, 2006 cited in U.S. Appl. No. 10/429,930.
Notice of Allowance dated Mar. 16, 2007 cited in U.S. Appl. No. 10/429,930.
Office Action dated Aug. 9, 2005 cited in U.S. Appl. No. 10/429,932.
Office Action dated Oct. 4, 2005 cited in U.S. Appl. No. 10/429,932.
Office Action dated Mar. 17. 2006 cited in U.S. Appl. No. 10/429,932.
Office Action dated Aug. 15, 2006 cited in U.S. Appl. No. 10/429,932.
Notice of Allowance dated Jan. 25, 2007 cited in U.S. Appl. No. 10/429,932.
Office Action dated Mar. 16, 2006 cited in U.S. Appl. No. 10/677,101.
Office Action dated Sep. 6, 2006 cited in U.S. Appl. No. 10/677,101.
Notice of Allowance dated Feb. 2, 2006 cited in U.S. Appl. No. 10/677,101.
Office Action dated Mar. 26, 2007 cited in U.S. Appl. No. 10/429,931.
Office Action dated Sep. 26, 2006 cited in U.S. Appl. No. 10/430,369.
Office Action dated Mar. 20, 2007 cited in U.S. Appl. No. 10/430,369.
Office Action dated Jan. 3, 2007 cited in U.S. Appl. No. 10/429,903.
Office Action dated Feb. 6, 2007 cited in U.S. Appl. No. 10/429,943.
Office Action dated Jul. 6, 2007 cited in U.S. Appl. No. 10/429,943.
Office Action dated Mar. 6, 2007 cited in U.S. Appl. No. 10/429,933.
Office Action dated Aug. 10, 2005 cited in U.S. Appl. No. 10/677,084.
Office Action dated Jan. 19, 2006 cited in U.S. Appl. No. 10/677,084.
Office Action dated Nov. 1, 2006 cited in U.S. Appl. No. 10/677,084.
Office Action dated Feb. 19, 2009 cited in U.S. Appl. No. 10/996,558.
Office Action dated Jan. 2, 2009 cited in U.S. Appl. No. 11/837,302.
Notice of Allowance dated Feb. 6, 2009 cited in U.S. Appl. No. 10/429,943.
Office Action dated Feb. 20, 2009 cited in U.S. Appl. No. 11/053,186.

* cited by examiner

METHOD AND SYSTEM FOR CAPTURING VIDEO ON A PERSONAL COMPUTER

CROSS-REFERENCE TO RELATED APPLICATIONS

The present invention is related to the following United States Patent Applications filed May 5, 2003, assigned to the assignee of the present invention, and hereby incorporated by reference in their entireties:

"Method and System for Auxiliary Display of Information for a Computing Device," Ser. No. 10/429,932;

"Real-Time Communications Architecture and Methods for use with a Personal Computer System," Ser. No. 10/429,905;

"Record Button on a Computer System," Ser. No. 10/429,904;

"Method and System for Auxiliary Processing Of Information for a Computing Device," Ser. No. 10/429,930;

"Computer System with Do Not Disturb System and Method," Ser. No. 10/429,903;

"Computer Camera System and Method for Reducing Parallax," Ser. No. 10/429,943;

"Control and Communications Panel for a Computer System," 10/429,933; and

"Notification Lights, Locations and Rules for a Computer System," 10/429,931.

FIELD OF THE INVENTION

The invention relates generally to computer systems, and more particularly to an improved method and system for capturing video on a personal computer.

BACKGROUND OF THE INVENTION

The role of contemporary computers continues to evolve as a tool used for communications and media applications. Personal computers offer many new and exciting media applications for personal entertainment such as live television, personal video recording, playing or recording digital music, displaying or creating digital photographs, playing movies recorded on a DVD, and so forth. Video controls may be provided by a video application through its software user interface for interacting with video supported by that application. However, such video controls are not available system-wide to other applications for users to control different video content.

In addition to handling media applications and customary communication applications such as email, instant messaging, fax communications, and so forth, with the introduction of Voice-over-IP (VOIP) and other IP telephony applications, computers may also be used for handling phone calls and voice mail. A personal computer with integrated telephony can enhance voice and video communication in ways that empower the user while increasing user productivity and enjoyment. For example, a personal computer may be designed that is capable of accepting incoming calls of various kinds such as analog Public Switched Telephone Network (PSTN), private branch exchange (PBX), cellular telephony, VoIP, and/or cellular telephony. Application programs may use VOIP telephony, instant messaging and videoconferencing by integrating the use of a microphone, speakers and camera.

While many media and communications programs work with video, such programs are neither intuitive nor straightforward for users to work with, nor consistent in how users interact with them. What is needed is a simplified system and method for a user to interact with these various communications and media applications, in a consistent way across these communication modalities. The system and method should operate in what is perceived to be an intelligent manner with respect to handling video communications. For example, capturing a video stream or still images, answering a phone call that supports video, and/or switching communications to and from video are possible usage scenarios that would benefit from improved video communications handling.

SUMMARY OF THE INVENTION

Briefly, the present invention provides a system and method for capturing and otherwise working with video on a personal computer. In one implementation, the present invention provides a camera that may include a microphone, a lens, a camera indicator light, a video capture button, and a lens cover that acts as a safeguard against inadvertent video recording or damage to the lens. In another implementation, a sensor for determining when the lens cover is closed may be used, along with an actuator for mechanically opening the lens cover, so that the system may optionally open the lens cover automatically for video capture applications. The actuator may be controlled by a button such as a shutter button or may be controlled by system software. Closing the lens cover secures active capture operations and, for example, may close an audio/video capture application. Opening the lens cover prepares the camera for capture, and may stream preview video to the audio/video capture application.

The present invention also provides video controls which may be placed in various locations such as on the computer housing, on a keyboard, on a monitor or a remote control. With these controls, a user may easily capture a video stream or still images. The video controls include a capture button and a shutter button. Other video controls may be easily added such as such as a zoom button and/or pan button for adjusting a telescoping lens, a microphone button for muting the microphone (e.g., on the camera), and so forth. Pressing the capture button while an audio/video application is executing usually triggers an image or video stream capture, depending on the mode setting. There may also be an optional record button in close proximity to the video controls. Because the state of an individual video control button may not be readily apparent to a user, an indicator light such as an LED may be located adjacent to or integrated into each video control button.

The present invention allows different types of video to be captured. For example, an audio/video application may capture a video stream or still images. If a user has selected still images to be captured, the audio/video application may set the camera capture indicator light to green to indicate that the application is in preview mode. A user may conveniently snap a still image by pressing the capture button. The application may then set the camera capture indicator light to blink red for a few moments while the image is captured. After the image has been captured, the application may display a confirmation dialog box to the user to allow for saving the image.

There are many applications that may use the present invention for capturing video and still images. For example, whenever there is an incoming phone call that supports video, the camera indicator light may indicate such a call, such as by slowly blinking red to alert the user. The user may then answer the call immediately in that mode by pressing the camera button. In response, the system automatically opens the video monitor, lights the camera indicator, and/or starts streaming video. Optionally, the user can set a preference so that the camera is automatically enabled whenever answering a call that supports video. Additionally, the system could automatically transition to video or from video (e.g., to an audio only state, or a state that displays something else) anytime during the call whenever the lens cover is opened or closed, respectively. When the call is over, the user may hang up by pressing the camera button which will terminate the call and turn off the camera indicator light.

The system and method is fairly comprehensive as well as flexible and extensible to handle essentially any video, and additional video controls may be easily added as needed. Other advantages will become apparent from the following detailed description when taken in conjunction with the drawings, in which:

DETAILED DESCRIPTION

Exemplary Operating Environment

Figure 1:
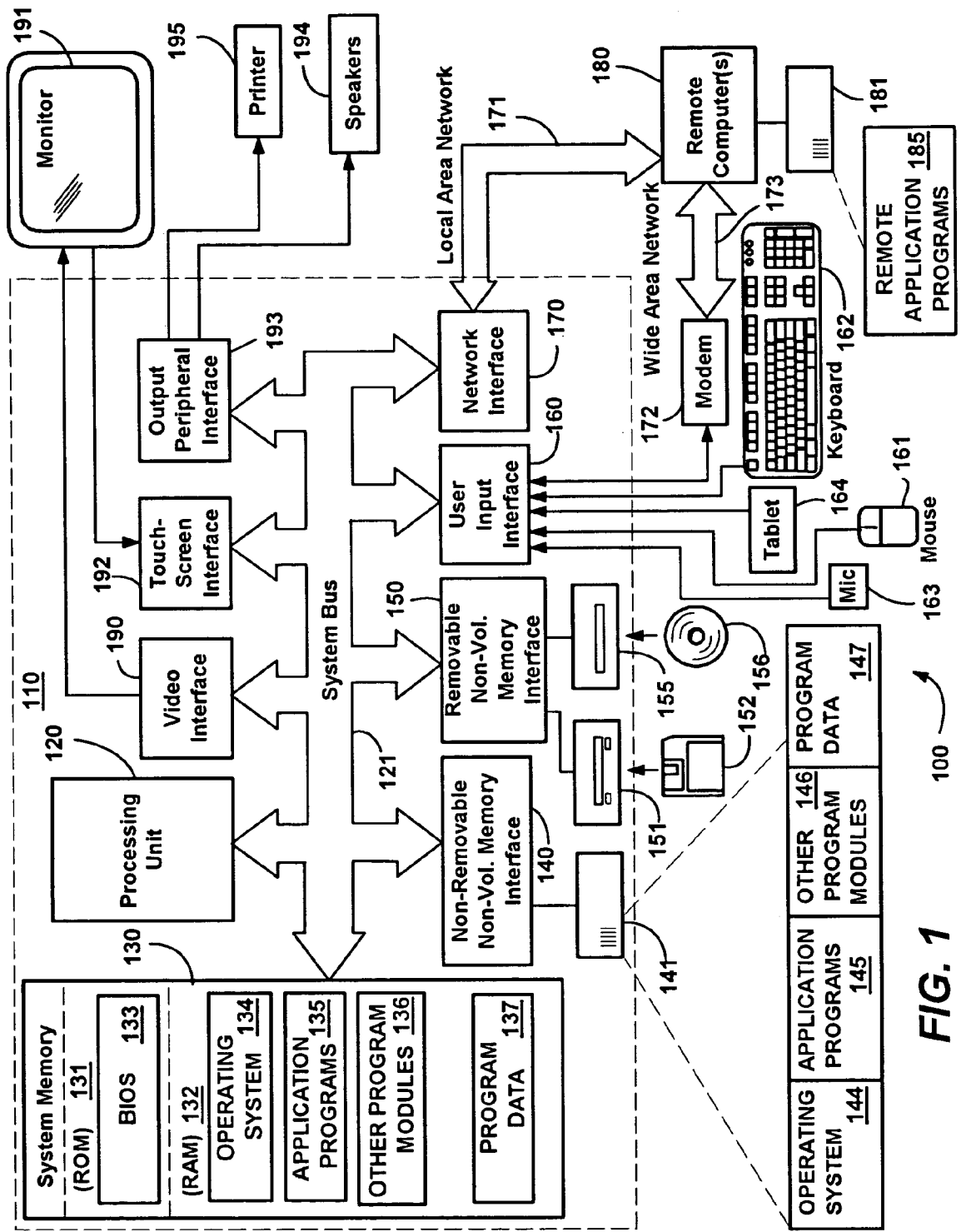
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise either computer storage media or communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Capturing Video

The present invention is generally directed towards an improved method and system for capturing video on a personal computer. The personal computer is equipped with video controls and a camera with a privacy lens cover. A sensor for determining when the lens cover is closed may be used, along with an actuator for mechanically opening the lens cover, so that the system may optionally open the lens cover automatically for video capture applications. A user may easily capture a video stream or still images using the video controls provided. A user may also answer an incoming phone call that supports video by pressing the camera button. The system may then open the video monitor, light the camera indicator, and start streaming video. Optionally, the user can set a preference so that the camera is automatically enabled whenever answering a call that supports video. Further, the system may be configured to automatically transition to video or from video (e.g., to an audio only state, or a state that displays something else) anytime during the call, whenever the lens cover is opened or closed, respectively. When the call is over, the system may be configured such that the user may hang up by pressing the camera button, which will terminate the call and turn off the camera indicator light. As will be understood, the various diagrams, devices and scenarios described herein are only examples, and there are many other scenarios to which the present invention applies.

Figure 2:
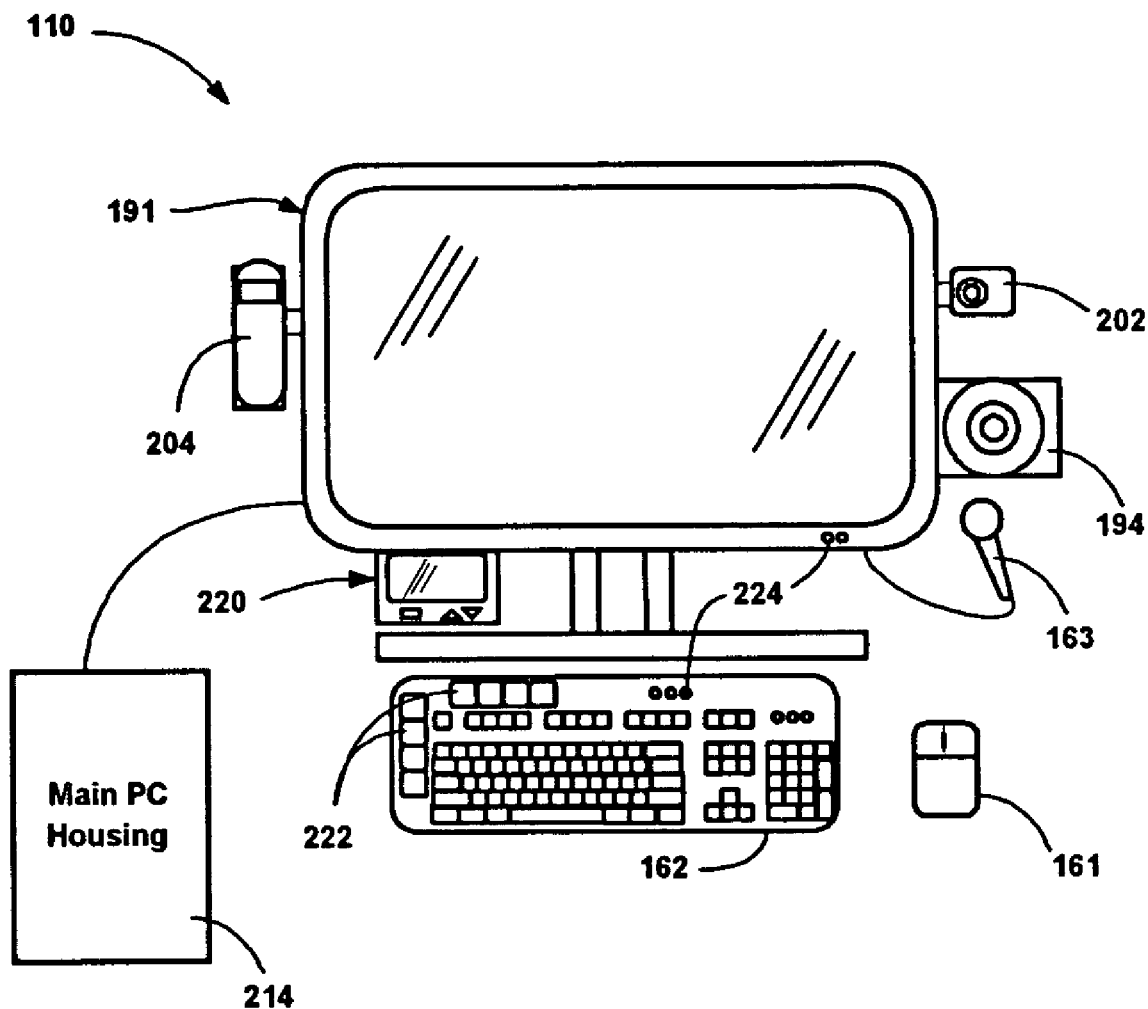
FIG. 2 is a general representation of a computer system arranged with integrated communications-related devices including a camera and video controls, in accordance with an aspect of the present invention.

Turning to FIG. 2 of the drawings, there is shown a computer system, such as the computer system 110 (of FIG. 1), in which various communications-related devices are integrated, including a camera and video controls. For example, the computer system 110 includes a monitor 191 having an attached camera 202, an attached telephone (e.g., handset) 204, and an attached speaker 194, which along with a microphone 163, may function as a speakerphone. Other devices not separately represented in FIG. 2 include mobile communications devices such as a cellular telephone or other mobile computing devices capable of connecting in some way (e.g., by wired cradle or Bluetooth™ technology) with the computer system. Although shown as individual devices in FIG. 2, it is understood that any or all of these devices, such as the speaker 194 and microphone 163, may be combined into a unitary assembly, or built into other devices, such as the monitor 191. In any event, each of these devices may be present and if so are connected directly or indirectly by a wired or wireless connection to interfaces at the main PC housing 214 (containing at least the motherboard, but also typically containing some non-volatile storage). As used herein, the terms "connect" and "couple" (and their variants) are equivalent and generally mean that there is some type of information capable of being transferred between one entity and another, regardless of whether directly or indirectly via any intermediaries and/or any transformation of the information.

Also represented in FIG. 2 is an auxiliary display device 220, such as for displaying caller ID data or like information as described below. The auxiliary display 220 is typically small (relative to the main display screen 191), and may be the display of another device, such as the screen of a mobile computing device, but may also be a dedicated display, such as one that is operably coupled to the computer operating system 110 is in a powered-up state. Further, note that the auxiliary display need not be an actual display, but can be a projection (e.g., onto a wall) of the information. The auxiliary display device 220 may provide some of its own processing and storage resources, so as to remain functional to some extent when the computer operating system is not running. The keyboard 162 and/or monitor 191 (and/or possibly the pointing device 161) may also include non-conventional buttons 222, such as buttons related to video controls, and non-conventional LED indicators 224, such as indicators related to video controls.

Figure 3:
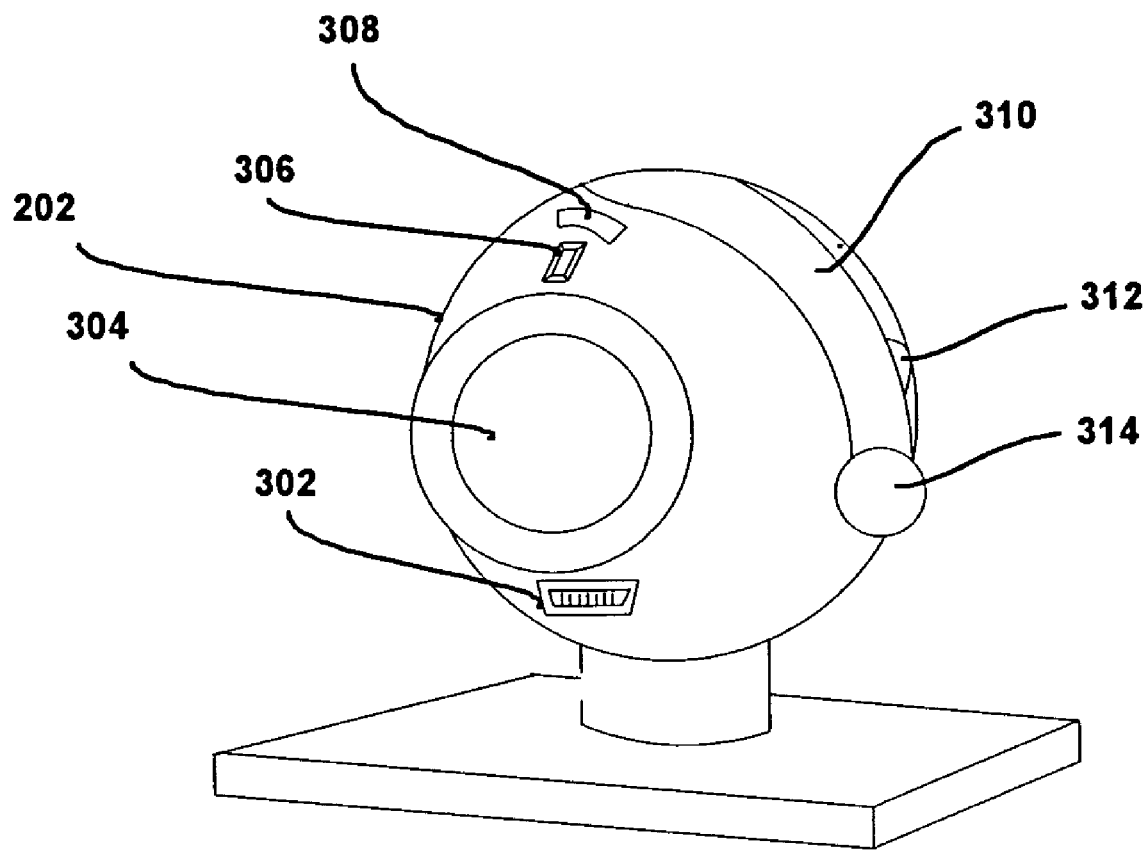
FIG. 3 is a general representation of a camera including a privacy shutter and video capture control, in accordance with an aspect of the present invention.

As generally represented in FIG. 3, the camera 202 coupled to the computer system 110 may include a microphone 302, a lens 304, a camera indicator light 306, a video capture button 308, a lens cover 310, a sensor 312, and an actuator 314. The capture button 308 may be located on the body of the camera where the right index finger normally rests while manually aiming the lens. Its behavior may vary and depends on the controlling software that is running when it is pressed. While an audio/video (A/V) capture application is executing, pressing the capture button 308 usually triggers an image or video stream capture, depending on the mode setting.

Because the state of the capture button 308 may not be readily apparent to a user, a camera indicator light 306 such as an LED may be used in conjunction with the capture button 308. The camera indicator light 306 may be adjacent the camera lens 304 or integrated into the capture button 308. The camera indicator light 306 may indicate state via various colors and flash patterns, e.g., steady state unlit when the camera is off, steady state red when video capture is taking place, a slowly blinking red indicator light when there is an incoming video call, or steady state green when the camera is used for proximity detection. Note that although video-capable applications can set this indicator to a particular color such as red when recording, the firmware may additionally ensure the indicator is set to red if the camera is actively streaming video.

The lens cover 310 acts as a safeguard against inadvertent video recording or damage to the lens 304. The lens cover 310 also provides visual reassurance to the user that the user is not being viewed or recorded when the lens cover 310 is closed and is thus covering the lens 304. The lens cover 310 is a physical, opaque barrier to the lens and may be a visor or swivel mechanism as depicted in FIG. 3 that exposes the lens from a bezel or protective cover. A sensor 312 may be operably coupled to the camera 202 for sensing the position of the lens cover, for sensing that the lens is covered, or for sensing that the lens is uncovered. The sensor may be any type of sensor such as a mechanical, electronic, optical or other sensor. It may be operably coupled to the camera 202 in any way such as placed on the lens 304, camera housing or lens cover 310. For example, a sensor such as in the form of a toggle switch may be operably coupled to the camera housing for sensing contact by the lens cover 310. Additionally, there may be an actuator 314 for mechanically opening and closing the lens cover. The actuator may be any type of actuator such as a motor, solenoid, electromagnetic actuator, piezoelectric actuator or other type of actuator. The actuator may be controlled by a button such as a shutter button or may be controlled by software. In general, closing the lens cover secures active capture operations and, for example, closes (or changes an operating mode of) the A/V capture application. Opening the lens cover prepares the camera for capture, and may stream preview video to the A/V capture application.

In one embodiment, image analysis software may sense when the lens is uncovered or covered by any way known to those skilled in the art, including by detecting the amount of light received through the camera lens. When the image analysis software determines the lens is uncovered, such as by determining there is sufficient light being received through the camera lens, the camera begins capturing a video stream. When the image analysis software determines the lens is covered, such as by determining there is insufficient light being received through the camera lens, the A/V capture application secures active capture operations and, for example, changes its operating mode or closes. Alternatively, if the video stream captured was being broadcast, then a still image may be broadcast for some period of time until sufficient light is received to continue video capture or before ceasing video capture operations.

Figure 4:
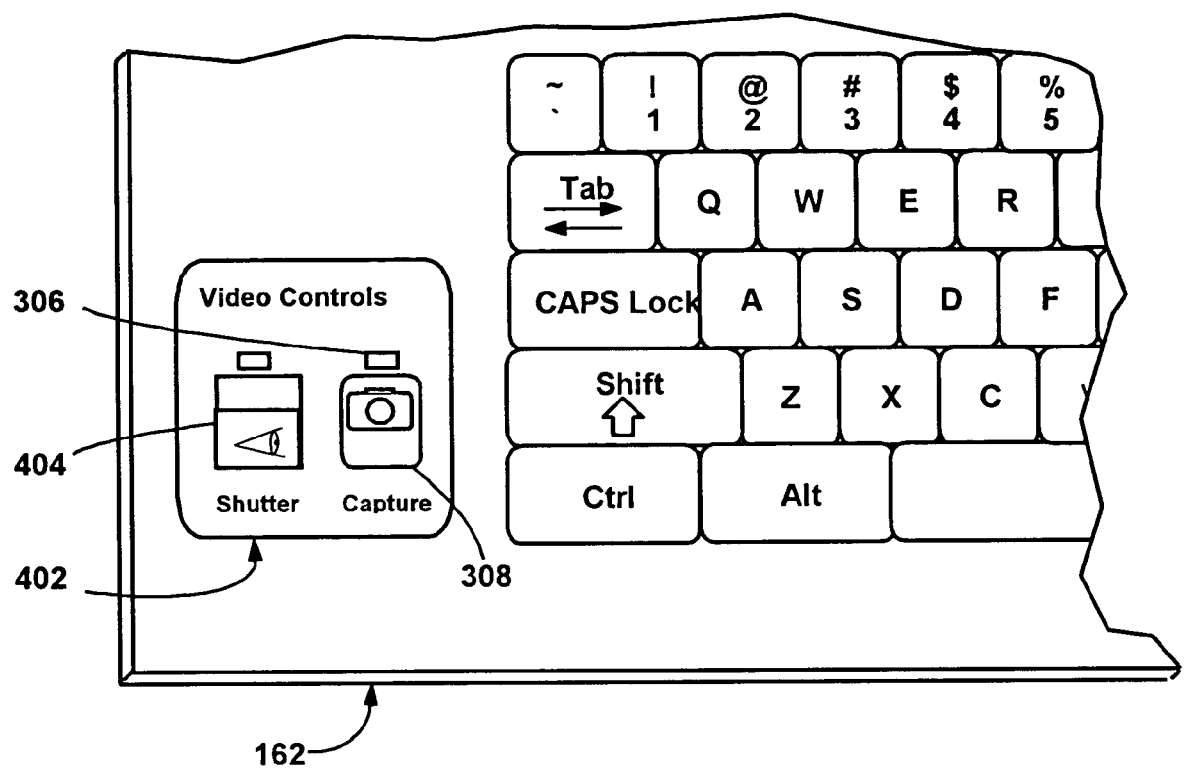
FIG. 4 is a general representation of a partial keyboard with video controls incorporated into the keyboard, in accordance with an aspect of the present invention.

The camera 202 and lens cover 310 may be operated using the video controls depicted in FIG. 4, which presents a general representation of a partial keyboard with video controls 402 incorporated into the keyboard 162. Note that an indicator light such as an LED may be optionally associated with (or incorporated into) one or more the video control buttons. For example, there may be an indicator light 306 associated with the capture button 308 that illuminates as a steady red light during video capture, as previously described. An actuator 314 may be integrated into the lens cover 310 which is operable by shutter button 404 open and close the lens cover 310. Other video control buttons may be included such as a Zoom button for adjusting a telescoping lens, a Microphone button for muting the microphone on the camera, and so forth. In one embodiment, there may also be an optional Record button (not shown) in close proximity to the video controls 402 for use in recording a video stream.

Figure 5:
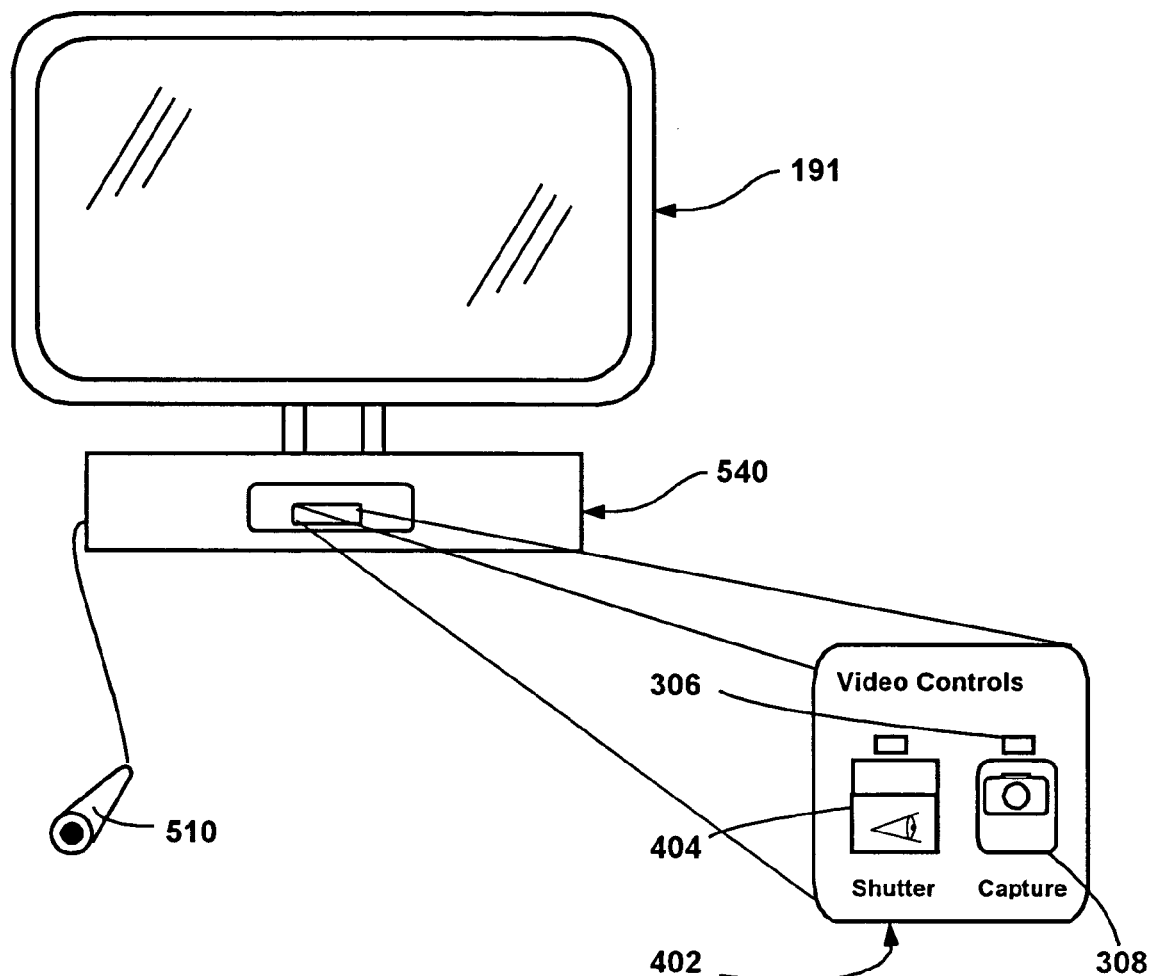
FIG. 5 is a representation of a control panel positioned beneath a computer monitor with video controls incorporated into the control panel, in accordance with an aspect of the present invention.
Figure 6:
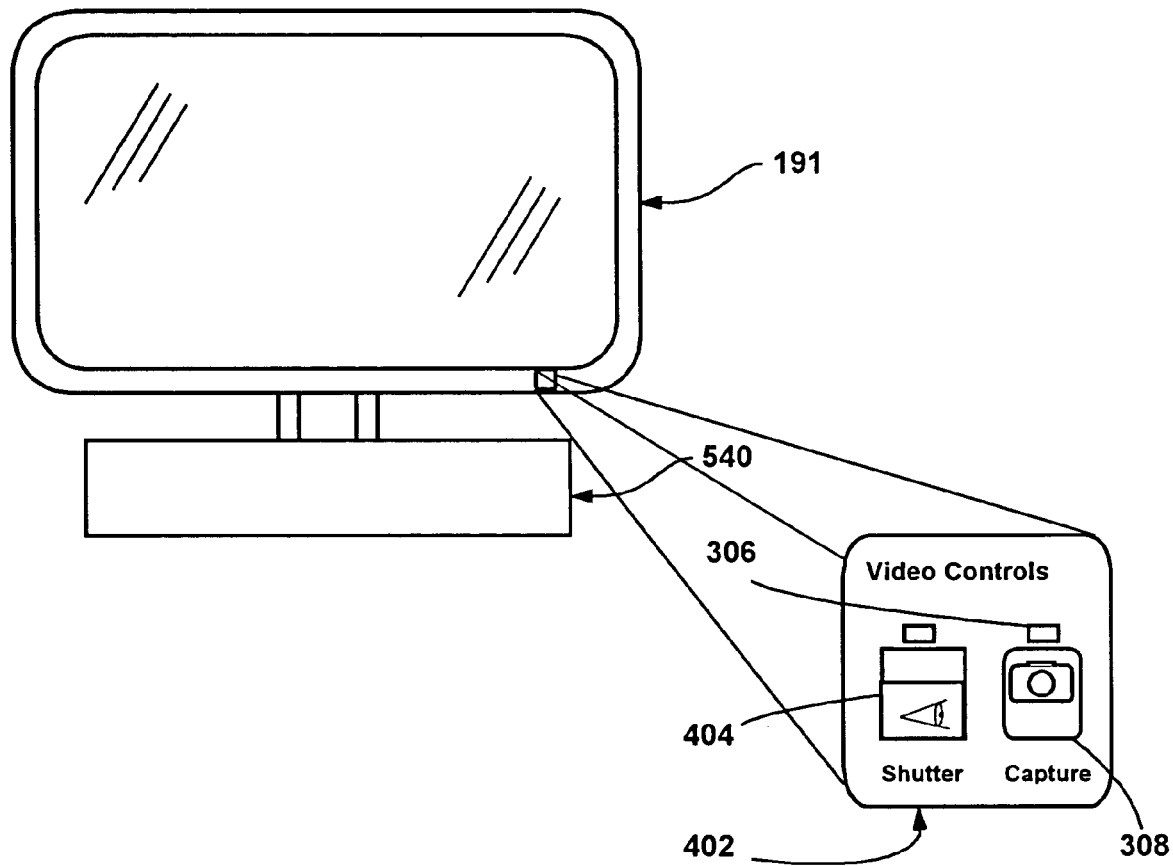
FIG. 6 is a representation of video controls incorporated into a monitor, in accordance with an aspect of the present invention.

It will be appreciated by those skilled in the art that the video controls 402 illustrated in FIG. 4 as incorporated in a keyboard are an exemplary configuration and that the present invention may be practiced using other configurations such as the configuration illustrated in FIG. 5 with the video controls located on a communications panel. In FIG. 5, the shutter button 404 and the capture button 308 are shown magnified from their location on a control panel 540 which is attached to or underneath the main display 191. A microphone 510 is also shown attached to the main display 191. This location of the video controls 402 may allow for good visibility of the video controls 402, but it may not be considered as convenient by some users to press the video control buttons as it would be if they were located on the camera such as the capture button illustrated in FIG. 3. FIG. 6 shows another exemplary illustration of the same two video controls located on the bezel of a monitor 191.

Figure 7:
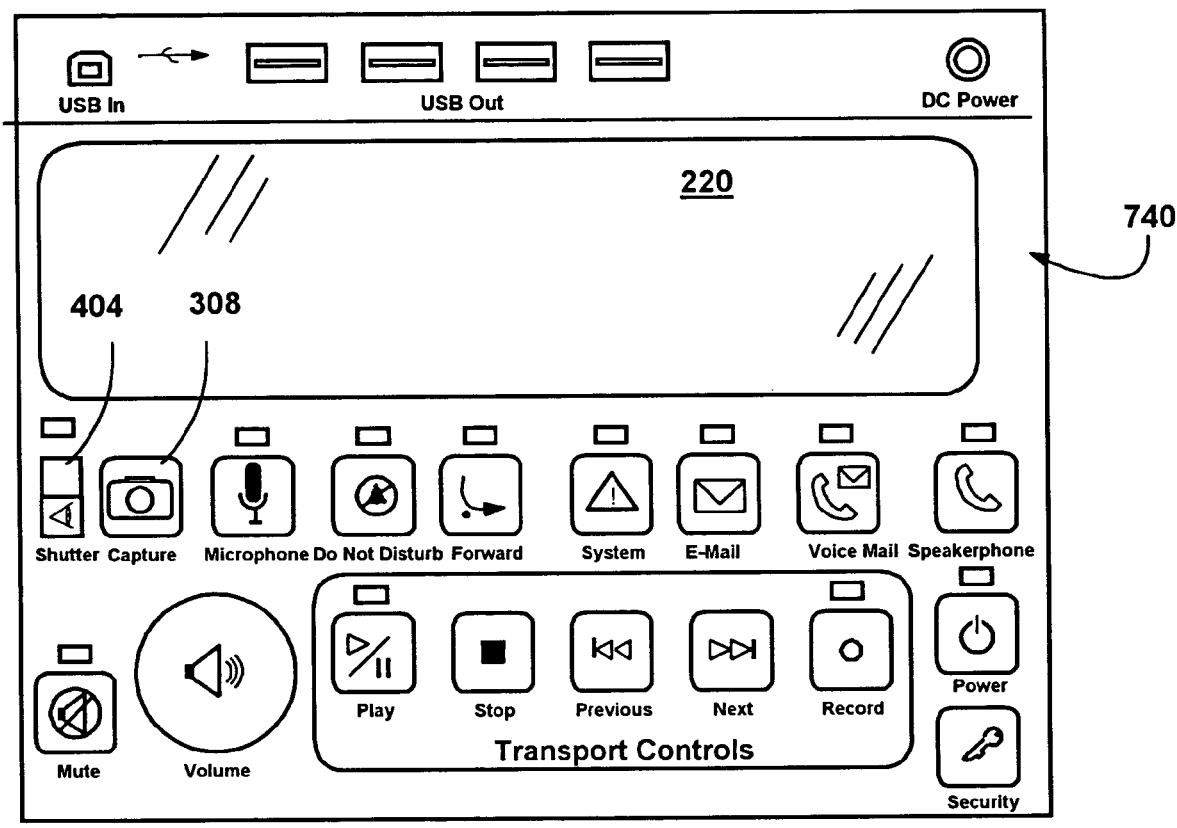
FIG. 7 is a representation of an alternative control panel with video controls, in accordance with an aspect of the present invention.
Figure 11:
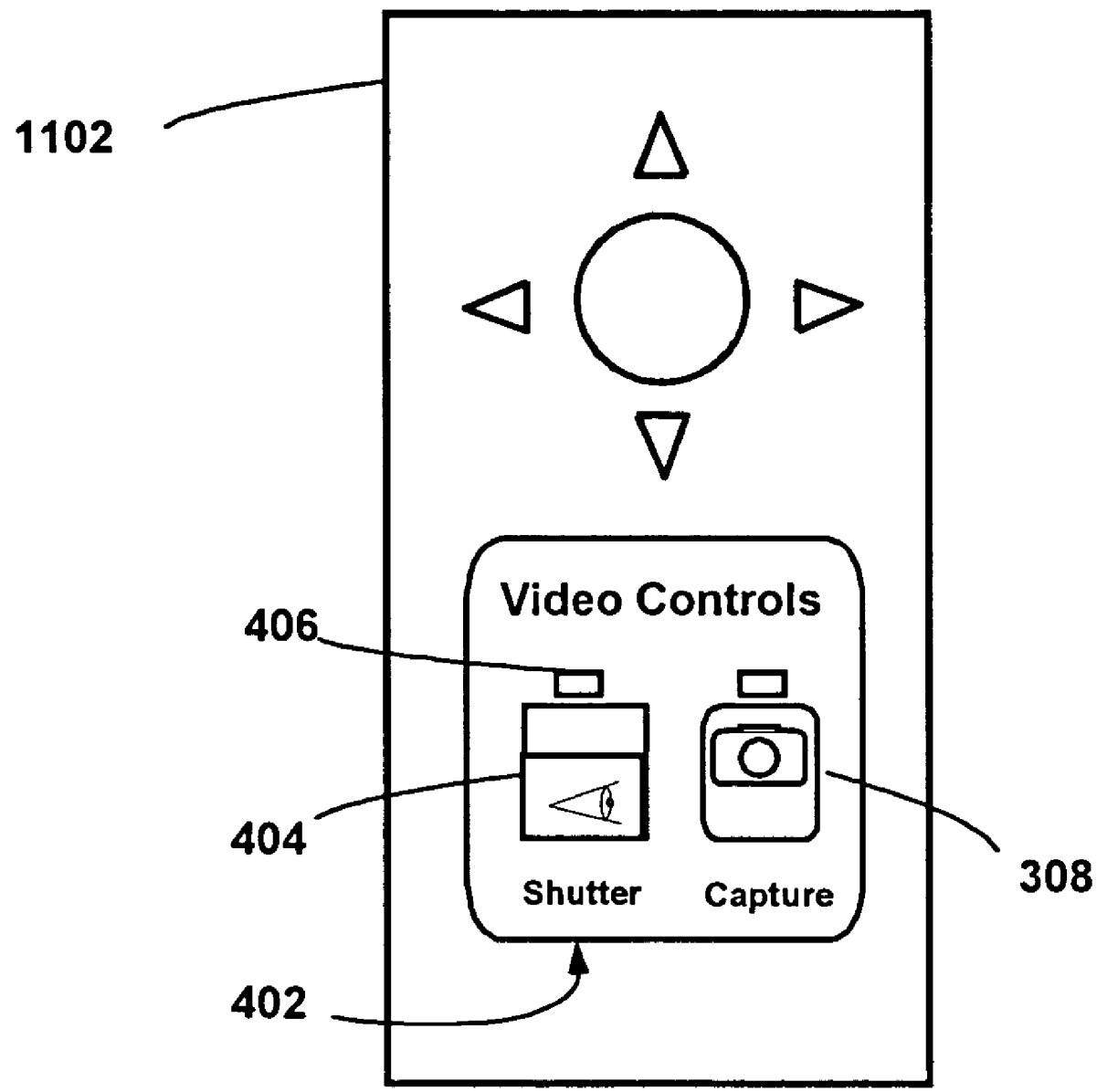
FIG. 11 is a representation of video controls incorporated into a remote control, in accordance with an aspect of the present invention.

FIG. 7 shows another alternative control panel 740 incorporating video controls 402 and including an auxiliary display 220. It should be appreciated that one or more video control 402 buttons, but may be grouped with some other set of buttons, or may be an independent button. In fact, the capture button 308 may be placed on the camera 202, as previously described and shown in FIG. 3. One or more of the video controls 402 may also be an add-on to a computer system, such as by providing button coupled to a USB or infrared port, or a Bluetooth™ device or other wired or wireless connection. A wired or wireless video control button, such as constructed to be held by a user, may also be provided either stand-alone or among buttons of a remote control. For example, FIG. 11 illustrates video control 402 incorporated into a remote control 1102.

Figure 8:
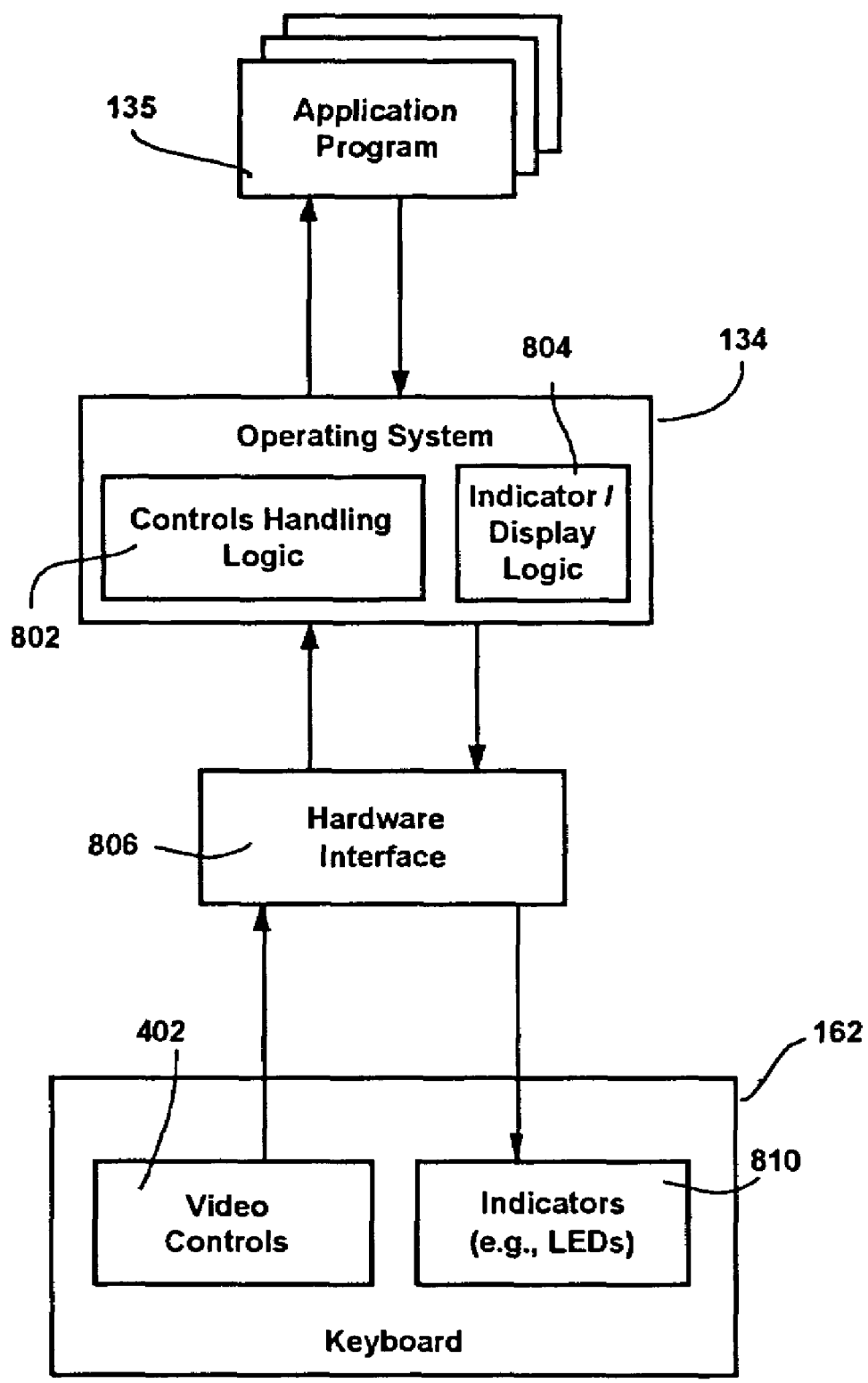
FIG. 8 is a block diagram generally representing the components in an exemplary embodiment of the telephony controls, in accordance with an aspect of the present invention.

FIG. 8 is a block diagram generally representing the components of an exemplary embodiment of the present invention for capturing video on a personal computer. Those skilled in the art will appreciate that the functionality implemented within the blocks illustrated in the diagram may be implemented as separate components, or the functionality of several or all of the blocks may be implemented within a lesser number of components (e.g., a single component). For example, a separate library may be implemented that contains the functionality of the control handling logic and the functionality of the display logic. In such an implementation, executables linked to the library may send control events directly to the control interface when they are executing on the computer system.

FIG. 8 shows how the video controls 402 may be used to perform computer and video capture-related tasks. In general, state changes or the like in the controls are provided to the control handling program (e.g., the operating system 134, or an application program 135 such as an A/V capture application program), along with data that identifies the control. Via controls handling logic 802, the control handling program then acts in the current context corresponding to the control. This may include generating one or more hardware or software events or commands, such as initiating video capture, pausing capture of a video stream, and so forth. These events or commands are sent to the camera 202 via the hardware interface 806.

The control handling program also controls any indicators 810 present as described above via indicator display logic 804 to convey information to the user. For example, the control handling logic 802 and the indicator/display logic 804 communicate with the hardware interface 806 to receive input from the video controls 402 and send output to the indicators 810 for display. Note that the indicators need not be LEDs, but include any type of mechanism that output information that is capable of being sensed by a user, including visual, audible and tactile output. Each of the indicators may be related to one of the controls, and thus each indicator may be incorporated into or positioned proximate its corresponding control. Where the indicators are LEDs, colors and illumination patterns (frequencies, duty cycles, number of pulses, and so further) may be varied to convey different information to users regarding each control.

Further, although an operating system 134 (or some application program 135) is shown in FIG. 8 as handling the controls, it should be noted that the computer system need not be fully operational for the video controls and/or the indicators to work in accordance with the present invention. Indeed, some of the controls may still work when the computer is powered down, at least to a default extent or to an extent configured by a user. For example, the user may want the camera to work as a conventional appliance when the computer system is powered down, so that the user may operate any applications that may allow video capture when the computer system is otherwise powered down. Any tasks that do not require a running operating system or application program similarly may remain operational and use the video controls when the operating system or application program is not available or in standby mode. For instance, the camera may be built into a tablet PC and can be used to record video stills and movies just like a digital camera. In this case, the video controls may be located on the edge or lid of the mobile computer or tablet PC. Upon opening the shutter, the A/V capture application may automatically launch and preview what the camera sees on the auxiliary display 220 placed near the video controls. Using the video controls, the user may then simply point-and-shoot video stills or movies which are automatically stored on computer-readable media.

To handle the controls and communications in such a powered-down mode, the control handling logic may be loaded into executable non-volatile memory, operated with a secondary processor, and so forth, so that communication works as long as some power is available, even though the disk, main processor, main display, network card and/or other parts of the system are powered down.

Figure 9:
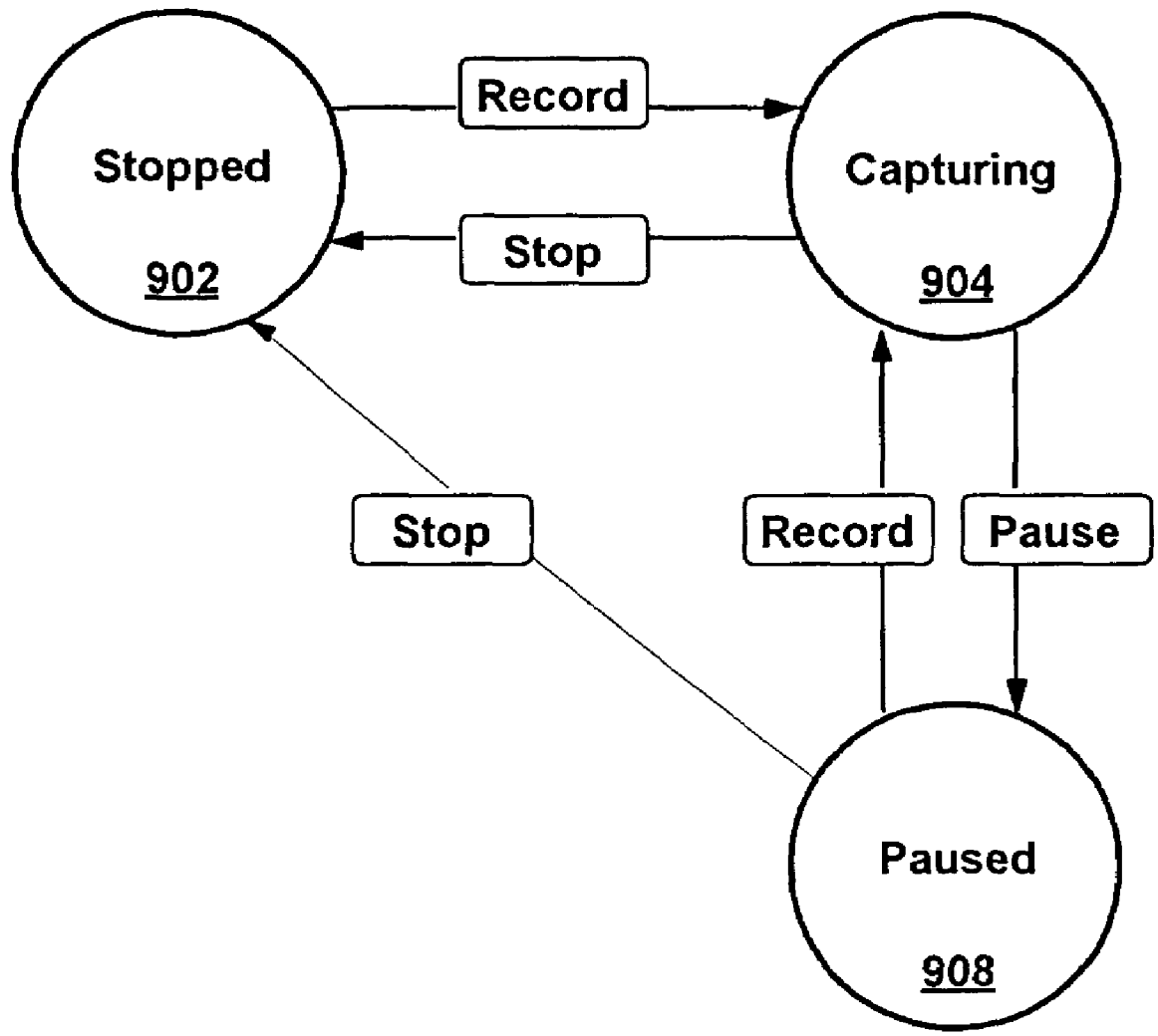
FIG. 9 is a general state diagram representing states of operation when capturing video, in accordance with an aspect of the present invention.

FIG. 9 presents a state diagram generally illustrating the states of operation of the control handling logic 802, for capturing a video stream. More particularly, the state diagram illustrates three states of operation applicable for video capture and the actions associated with the transition between the states. FIG. 9 will be described using an A/V capture application as an example of an application 135. As will be understood, the operations using the video controls for the A/V capture application is one example of many applications that may use the video controls for capturing video streams and still images.

A user who wishes to capture a video stream opens the lens cover 310, whether manually or by pressing an actuator button that opens the lens cover 310. Before capture of a video stream occurs, the system is in the Stopped 902 state. Whenever a capture event is received and the shutter 310 is open, the system transitions to the Capturing 904 state and the camera begins capturing a video stream. In one embodiment, the shutter may only be opened by the user for privacy reasons. In this case, the user may press the shutter button 404 to open the lens cover or manually move the lens cover to expose the lens. In another embodiment, the lens cover may be automatically opened whenever a capture event occurs. A capture event occurs whenever the user presses the capture button 308 while in the Stopped state 902. It will be appreciated by those skilled in the art that there are other ways of generating a capture event, such as opening the shutter 310, pressing the record button within the transport controls of FIG. 7, selecting a menu item using a graphical user interface, and so forth. In yet a third embodiment, image analysis software may sense when the lens is uncovered or covered by any way known to those skilled in the art, including detecting the amount of light received through the camera lens. When the images analysis software senses that the lens is uncovered, a capture event is generated. For example, the image analysis software may determine that sufficient light is being received through the camera lens, and a capture event may be generated that triggers the camera to begin capturing a video stream.

A user may also wish to pause capturing a video stream. If a pause event occurs while the system is in Capturing 904 state, then the system transitions to the Paused 908 state. A pause event occurs during video capture whenever the user presses a pause button, such as the play/pause button illustrated within the transport controls of FIG. 7. Yet again, a pause event may be generated in one embodiment whenever image analysis software detects insufficient light is being received through the camera lens. Alternatively, a pause event may be generated in other ways such as pressing and holding the capture button for several seconds, selecting from a menu item using a graphical user interface, and so forth. In one embodiment, if the captured video stream was being broadcast prior to entering the Paused 908 state, the last image captured before pausing may be broadcast while in the Paused 908 state. Alternatively, a static image may also be broadcast while in the Paused 908 state. Pressing the play/pause button or the capture button while paused generates a capture event, which transitions the system back to the Capturing 904 state and video capture continues.

A user may wish to end video capture during capturing of the video stream or while capturing is paused. If a stop event occurs while the system is in the Paused 908 state or the Capturing 904 state, the system transitions to the Stopped 902 state. A stop event occurs whenever the user presses the capture button 308 while in the Capturing 904 state. A stop event may alternatively be generated in one embodiment whenever image analysis software may detect that the lens is covered by any way known to those skilled in the art, including insufficient light is being received through the camera lens. A stop event may also be generated by other ways such as pressing the stop button illustrated within the transport controls of FIG. 7, selecting from a menu item using a graphical user interface, and so forth. While in the Stopped 902 state, the system ceases video capture.

Figure 10:
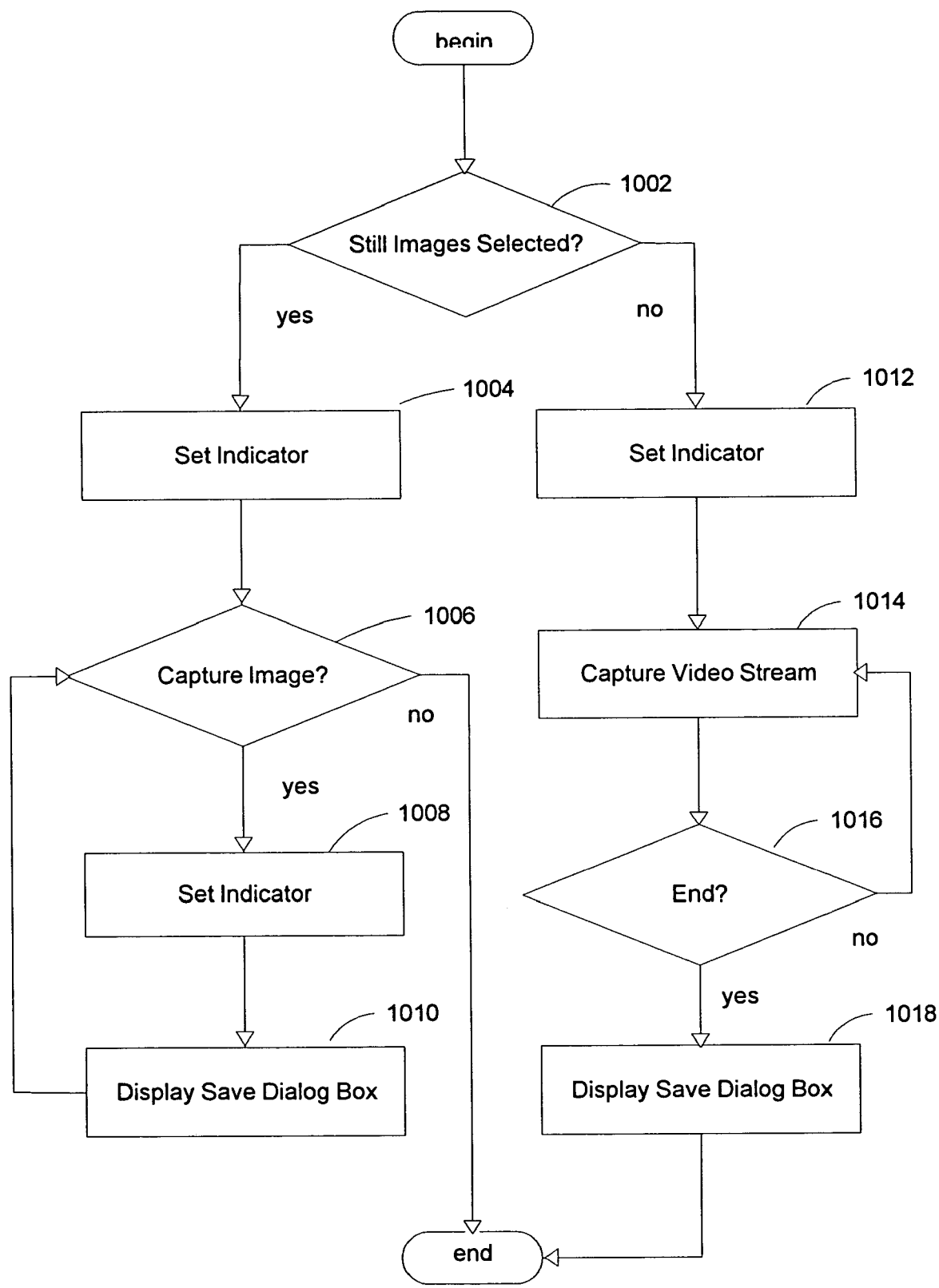
FIG. 10 is a flowchart illustrating an exemplary audio/video application using the camera to capture a video stream, in accordance with an aspect of the present invention.

FIG. 10 presents a flowchart illustrating an A/V capture application using the video controls 402 to capture a video stream or still images. The A/V capture application may be launched whenever a capture event occurs such as opening the lens cover 310. Those skilled in the art will appreciate that there are other ways of launching the application, such as a user may launch it by pressing the capture button 308 or selecting the application from a menu of a graphical user interface, or the computer system may launch the application in response to receiving an incoming phone call that supports video, and so forth. First, the A/V capture application checks if a video stream or still images are to be captured at step 1002.

If the user has selected still images to be captured in the A/V capture application, then the application sets the camera capture indicator light 306 to green at step 1004 to indicate that the A/V capture application is in preview mode. At step 1006, the application then checks if the user has pressed the camera capture button 308 to capture the image previewed. If the user has not pressed the capture button 308 within a configurable time period or the user closes the lens cover 310, then the application is finished processing. However, if the user has pressed the capture button 308, then the application snaps the image, sets the camera capture indicator light 306 to blink red for a few seconds, and then sets the camera capture indicator light 306 back to green at step 1008. The application then displays a dialog box for the user to confirm that the image is to be saved at step 1010.

If the user has not selected still images to be captured in the A/V capture application, then the application sets the camera capture indicator light 306 to red at step 1012 to indicate that the A/V capture application is in the mode of capturing a video stream. The camera begins capturing the video stream at step 1014. The application periodically checks if the user has made any indication to stop capturing the video stream at step 1016. If no indication has been made, the application continues to capture the video stream at step 1014. If the user has pressed the capture button 308 or otherwise has made an indication to stop, the application then displays a dialog box for the user to confirm that the image is to be saved at step 1018. The application is then finished processing and the camera indicator light is turned off.

Although FIGS. 9 and 10 were described using an A/V capture application as an example, those skilled in the art will appreciate that there are many applications that may use the camera and video controls for capturing video and still images. For example, whenever there is an incoming phone call that supports video, the camera indicator light 306 may slowly blink red to alert the user. The user may then answer the call immediately in that mode by pressing the camera button 308. If the user presses the camera button, the system opens the video monitor, lights the camera indicator, and starts streaming video. Optionally, the user can set a preference so that the camera is automatically enabled whenever answering a call that supports video. Additionally, the system could automatically transition to or from video anytime during the call whenever the lens cover 310 is opened or closed. When the call is over, the user may hang up by pressing the camera button which will terminate the call and turn off the camera indicator light.

As can be seen from the foregoing detailed description, there is provided a system and method for capturing video on a personal computer. The personal computer is equipped with video controls and a camera with a privacy lens cover. The system allows users to intuitively activate and interact with video applications such as handling phone calls and recording still images. The system and method is fairly comprehensive in its ability to capture video, as well as flexible and extensible to handle many uses. Additional video controls may be easily added. The system and method thus provide significant advantages and benefits needed in contemporary computing and communications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system that has a camera for capturing video and that receives telephone calls, a method for commencing a video capture simultaneously with answering a telephone call, the method comprising:
   receiving a telephone call that supports video at the computer system;
   displaying an indication to a user of the computer system that the telephone call has been received;
   in response to the user pressing a button of the computer system, simultaneously answering the telephone call and commencing a video capture;
   streaming the captured video in conjunction with the telephone call; and
   in response to the user closing a lens cover of the camera, ending the video capture without hanging up the telephone call such that the telephone call transitions to an audio only state.

2. The method of claim 1 further comprising:
   subsequent to the user closing the lens cover of the camera and in response to the user opening the lens cover of the camera, recommencing the video capture.

3. The method of claim 1 wherein the button is located on one of the following:
- the camera,
- a computer monitor,
- a computer keyboard,
- a computer housing,
- a communications panel, and
- a remote control.

4. The method of claim 1 wherein the button comprises one of a capture button and a shutter button.

5. The method of claim 1 further comprising:
determining that there is insufficient light for capturing the video and in response, streaming a still image.

6. The method of claim 5 wherein the still image comprises the last frame captured prior to determining that there is insufficient light for capturing the video stream.

7. A computer storage medium having stored computer-executable instructions which when executed by a computer system having a camera for capturing video perform a method for commencing a video capture simultaneously with answering a telephone call, the method comprising:
receiving a telephone call that supports video at the computer system;
displaying an indication to a user of the computer system that the telephone call has been received;
in response to the user pressing a button of the computer system, simultaneously answering the telephone call and commencing a video capture; streaming the captured video in conjunction with the telephone call; and
in response to the user closing a lens cover of the camera, ending the video capture without hanging up the telephone call such that the telephone call transitions to an audio only state.

8. The computer storage medium of claim 7 further comprising:
subsequent to the user closing the lens cover of the camera and in response to the user opening the lens cover of the camera, recommencing the video capture.

9. The computer storage medium of claim 7 wherein the button is located on one of the following:
- the camera,
- a computer monitor,
- a computer keyboard,
- a computer housing,
- a communications panel, and
- a remote control.

10. The computer storage medium of claim 7 wherein the button comprises one of a capture button and a shutter button.

11. The computer storage medium of claim 7 further comprising:
determining that there is insufficient light for capturing the video and in response, streaming a still image.

12. The computer storage medium of claim 11 wherein the still image comprises the last frame captured prior to determining that there is insufficient light for capturing the video stream.

13. A computer system that has a camera for capturing video and that receives telephone calls comprising:
a processor; and
a memory in communication with the processor having stored thereon instructions which when executed cause the processor to perform a method for commencing a video capture simultaneously with answering a telephone call, the method comprising:
receiving a telephone call that supports video at the computer system;
displaying an indication to a user of the computer system that the telephone call has been received;
in response to the user pressing a button of the computer system, simultaneously answering the telephone call and commencing a video capture; streaming the captured video in conjunction with the telephone call; and
in response to the user closing a lens cover of the camera, ending the video capture without hanging up the telephone call such that the telephone call transitions to an audio only state.

14. The system of claim 13 wherein the performed method further comprises:
subsequent to the user closing the lens cover of the camera and in response to the user opening the lens cover of the camera, recommencing the video capture.

15. The system of claim 13 wherein the button is located on one of the following:
- the camera,
- a computer monitor,
- a computer keyboard,
- a computer housing,
- a communications panel, and
- a remote control.

16. The system of claim 13 wherein the button comprises one of a capture button and a shutter button.

17. The system of claim 13 wherein the performed method further comprises:
determining that there is insufficient light for capturing the video and in response, streaming a still image.

18. The system of claim 17 wherein the still image comprises the last frame captured prior to determining that there is insufficient light for capturing the video stream.

* * * * *